(12) United States Patent
Hegna et al.

(10) Patent No.: US 9,903,966 B2
(45) Date of Patent: Feb. 27, 2018

(54) SEISMIC DATA ACQUISITION

(71) Applicant: PGS Geophysical AS, Oslo (NO)

(72) Inventors: Stian Hegna, Hovik (NO); Gregg E Parkes, Corsham (GB)

(73) Assignee: PGS Geophysical AS, Oslo (NO)

( * ) Notice: Subject to any disclaimer, the term of this patent is extended or adjusted under 35 U.S.C. 154(b) by 536 days.

(21) Appl. No.: 14/490,912

(22) Filed: Sep. 19, 2014

(65) Prior Publication Data

US 2015/0293241 A1 Oct. 15, 2015

Related U.S. Application Data

(60) Provisional application No. 61/979,247, filed on Apr. 14, 2014.

(51) Int. Cl.
| | | |
|---|---|---|
| *G01V 1/38* | (2006.01) | |
| *G01V 1/00* | (2006.01) | |
| *G01V 1/28* | (2006.01) | |
| *G01V 1/32* | (2006.01) | |
| *G01V 1/36* | (2006.01) | |

(52) U.S. Cl.
CPC ............... *G01V 1/003* (2013.01); *G01V 1/28* (2013.01); *G01V 1/325* (2013.01); *G01V 1/36* (2013.01); *G01V 1/3808* (2013.01); *G01V 2210/00* (2013.01); *G01V 2210/129* (2013.01); *G01V 2210/42* (2013.01); *G01V 2210/56* (2013.01); *G01V 2210/59* (2013.01)

(58) Field of Classification Search
CPC ...... G01V 1/003; G01V 1/3808; G01V 1/325; G01V 1/28; G01V 1/36; G01V 2210/129; G01V 2210/56; G01V 2210/00; G01V 2210/42; G01V 2210/59

See application file for complete search history.

(56) References Cited

U.S. PATENT DOCUMENTS

| | | |
|---|---|---|
| 3,676,841 A | 7/1972 | Anstey |
| 4,458,339 A | 7/1984 | Wason |
| 4,739,858 A | 4/1988 | Dragoset, Jr. |
| 5,761,152 A | 6/1998 | Jacobsen et al. |
| 6,049,507 A * | 4/2000 | Allen ............... G01V 1/364 367/21 |
| 6,751,559 B2 | 6/2004 | Fookes et al. |
| 6,882,938 B2 | 4/2005 | Vaage et al. |

(Continued)

FOREIGN PATENT DOCUMENTS

| | | |
|---|---|---|
| EP | 2787370 A2 | 10/2014 |
| EP | 2793058 A1 | 10/2014 |

(Continued)

OTHER PUBLICATIONS

PCT Search Report and Written Opinion dated Jul. 6, 2015, in the prosecution of international patent application No. PCT/EP2015/057841, 14 pages.

(Continued)

*Primary Examiner* — Krystine E Breier

(57) ABSTRACT

A method for seismic data acquisition can include near-continuously recording seismic data received from a number of seismic receivers and triggering a plurality of source elements, based upon time and not based upon position, at a predefined sequence of times relative to a start of a near-continuous recording.

21 Claims, 11 Drawing Sheets

(56) References Cited

U.S. PATENT DOCUMENTS

| | | |
|---|---|---|
| 6,906,981 B2 | 6/2005 | Vaage et al. |
| 7,031,223 B2 | 4/2006 | Kinkead |
| 7,257,049 B1 | 8/2007 | Laws et al. |
| 7,391,673 B2 | 6/2008 | Regone et al. |
| 7,502,690 B2 | 3/2009 | Thomsen et al. |
| 7,869,303 B2 | 1/2011 | Kinkead |
| 7,872,942 B2 | 1/2011 | Sollner |
| 7,916,576 B2 | 3/2011 | Beasley et al. |
| 7,941,273 B2 | 5/2011 | Thomsen et al. |
| 8,218,393 B2 | 7/2012 | Beasley |
| 8,295,124 B2 | 10/2012 | Abma |
| 8,299,784 B2 | 10/2012 | Farrelly et al. |
| 8,345,510 B2 | 1/2013 | Hegna et al. |
| 8,395,966 B2 | 3/2013 | Moore et al. |
| 8,427,901 B2 | 4/2013 | Lunde et al. |
| 8,559,270 B2 | 10/2013 | Abma |
| 8,588,025 B2 | 11/2013 | Moldoveanu et al. |
| 8,596,409 B2 | 12/2013 | Parkes et al. |
| 8,619,497 B1 | 12/2013 | Sallas et al. |
| 8,724,428 B1* | 5/2014 | Sallas .................. G01V 1/005 367/38 |
| 8,730,760 B2 | 5/2014 | Cambois et al. |
| 9,213,120 B2* | 12/2015 | Kostov ................ G01V 1/3808 |
| 2002/0181328 A1 | 12/2002 | de Kok |
| 2004/0013037 A1 | 1/2004 | Vaage |
| 2005/0034917 A1 | 2/2005 | Mathiszik et al. |
| 2007/0268781 A1 | 11/2007 | Meunier et al. |
| 2008/0019214 A1 | 1/2008 | Pramik |
| 2009/0168600 A1 | 7/2009 | Moore et al. |
| 2009/0323472 A1 | 12/2009 | Howe |
| 2009/0326895 A1 | 12/2009 | Beasley |
| 2010/0039894 A1 | 2/2010 | Abma |
| 2010/0302900 A1 | 12/2010 | Tenghamn |
| 2011/0019502 A1* | 1/2011 | Eick ........................ G01V 1/20 367/50 |
| 2011/0079461 A1 | 4/2011 | Allen et al. |
| 2011/0128818 A1 | 6/2011 | Eick et al. |
| 2011/0141850 A1 | 6/2011 | Scott et al. |
| 2012/0014212 A1* | 1/2012 | Eick .................... G01V 1/3808 367/23 |
| 2012/0014213 A1 | 1/2012 | Eick et al. |
| 2012/0033525 A1 | 2/2012 | Abma et al. |
| 2012/0033526 A1 | 2/2012 | Hegna et al. |
| 2012/0147699 A1 | 6/2012 | Dellinger et al. |
| 2012/0147701 A1 | 6/2012 | Ross et al. |
| 2012/0155217 A1 | 6/2012 | Dellinger et al. |
| 2012/0155218 A1 | 6/2012 | Beasley et al. |
| 2012/0176861 A1 | 7/2012 | Abma et al. |
| 2012/0307591 A1 | 12/2012 | Hegna et al. |
| 2013/0028048 A1 | 1/2013 | Sollner |
| 2013/0028051 A1 | 1/2013 | Barkved et al. |
| 2013/0088235 A1 | 4/2013 | Hegna et al. |
| 2013/0088938 A1* | 4/2013 | Aaron .................. G01V 1/3861 367/23 |
| 2013/0121109 A1 | 5/2013 | Baardman et al. |
| 2013/0322205 A1 | 12/2013 | Widmaier et al. |
| 2014/0016436 A1 | 1/2014 | Sollner et al. |
| 2014/0140168 A1 | 5/2014 | Howe |
| 2015/0003195 A1* | 1/2015 | Widmaier ............ G01V 1/3817 367/16 |
| 2015/0131409 A1* | 5/2015 | Abma ................... G01V 1/003 367/7 |

FOREIGN PATENT DOCUMENTS

| | | |
|---|---|---|
| GB | 2390902 A | 1/2004 |
| WO | 2009131619 A2 | 10/2009 |
| WO | 2015011160 A1 | 1/2015 |

OTHER PUBLICATIONS

Zhang et al., "A marine node simultaneous source acquisition trial at Atlantis, Gulf of Mexico," SEG Houston 2013 Annual Meeting, SEG Technical Program Expanded Abstracts, pp. 99-103, 2013.

Jiang et al., "An analysis on the simultaneous imaging of simultaneous source data," SEG Denver 2010 Annual Meeting, Oct. 17-22, 2010, Denver, CO, 5 pp.

Abma et al., "An overview of BP's Marine Independedent Simultaneous Source Fields," SEG 2012 Las Vegas Annual Meeting, Nov. 4-9, 2012, Las Vegas, NE.

Abma et al., "Sparse inversion and the distribution of airgun array energy over time," SEG Houston 2013 Annual Meeting, SEG Technical Program Expanded Abstracts, pp. 31-35.

Akerberg, "Simultaneous source separation by sparse Radon transform," SEG 2008 Las Vegas Annual Meeting, Nov. 9-14, Las Vegas, NE, 5 pp.

Alexander et al., "Processing results of simultaneous source surveys compared to conventional surveys," SEG Houston 2013 Annual Meeting, SEG Technical Program Expanded Abstracts, pp. 104-108.

Howe et al., "Independent Simultaneous Sweeping in Libya—full scale implementation and new developments," 2009 SEG Annual Meeting, Oct. 25-30, Houston, TX, 3 pp.

Spitz et al., "Simultaneous source separation: a prediction-subtraction approach," SEG 2008 Las Vegas Annual Meeting, Nov. 9-14, Las Vegas, NE, 5 pp.

Moore et al., "Simultaneous Source Separation Using Dithered Sources," SEG Las Vegas 2008 Annual Meeting, pp. 2806-2810.

International Preliminary Report on Patentability for related PCT Application PCT/EP2015/057841, dated Oct. 27, 2016 (10 pgs).

* cited by examiner

SEISMIC DATA ACQUISITION

CROSS-REFERENCE TO RELATED APPLICATIONS

This application claims priority to U.S. Provisional Application 61/979,247, filed Apr. 14, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine seismic survey vessel tows one or more seismic sources below the surface of the water and over a subterranean formation to be surveyed for mineral deposits. Seismic receivers may be located on or near the water bottom, such as being fixed on the water bottom or anchored so as to be near the water bottom, on one or more streamers towed by the source vessel, or on one or more streamers towed by another vessel. The source vessel typically contains marine seismic survey equipment, such as navigation control, seismic source control, seismic receiver control, and recording equipment. The seismic source control may cause the one or more seismic sources, which are typically air guns or marine vibrators, to produce acoustic signals at selected times (often referred to as "firing a shot" or "shooting").

Each acoustic signal is essentially a sound wave that travels down through the water and into the subterranean formation. At each interface between different types of rock or other formations of differing composition, a portion of the sound wave may be refracted, a portion of the sound wave may be transmitted, and another portion may be reflected back toward the body of water to propagate toward the surface. The streamers towed behind the vessel are generally elongated cable-like structures. Each streamer includes a number of seismic receivers that detect pressure and/or particle motion changes in the water created by the sound waves reflected back into the water from the subterranean formations. The seismic receivers thereby measure a wavefield that was ultimately initiated by the triggering of the seismic source.

DETAILED DESCRIPTION

Figure 1A:
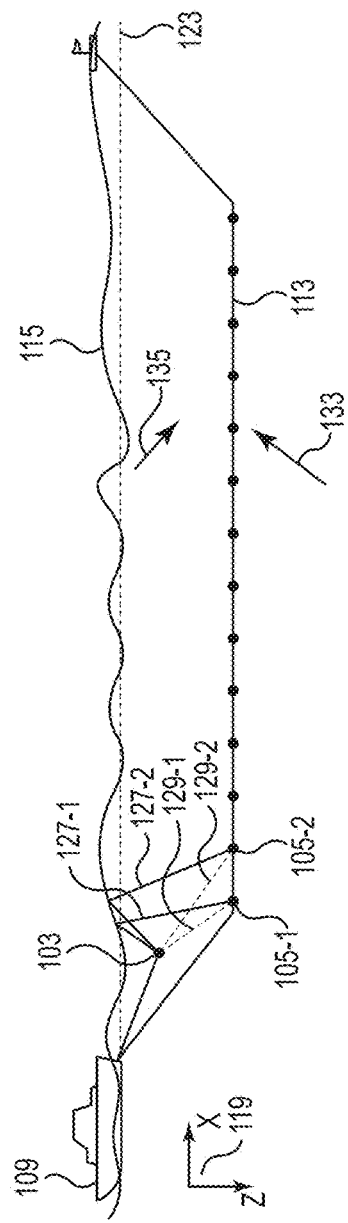
FIGS. 1A-1B illustrate coordinates and terminology associated with seismic data acquisition and/or seismic data processing according to one or more embodiments of the present disclosure.

The present disclosure is related to seismic data acquisition and/or processing with source signal emission sequences and continuous and/or near-continuous recording. Embodiments of the present disclosure allow for acquisition and/or processing of seismic data with fewer limitations on minimum shot intervals (time between shots), minimum record lengths, and/or maximum acquisition speeds as compared to other approaches of seismic data acquisition and/or processing. Further, embodiments of the present disclosure allow for emitting signals from sources, such as one or more source elements, as described herein, without an allotted and/or required listening period between shots. Embodiments of the present disclosure further allow for source triggering based on time, rather than position. Seismic data are recorded continuously or near-continuously and positions of source elements and/or seismic receivers can be derived as a function of time. For example, the positions of the source elements and/or the seismic receivers can be derived based on seismic data input from one or more navigation systems of a marine seismic survey vessel, the positions of the source elements and/or the seismic receivers determined as a function of time relative to a start time of the continuous or near-continuous recording.

It is to be understood the present disclosure is not limited to particular devices or methods, which may vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

This disclosure is related generally to the field of marine seismic surveying. For example, this disclosure may have applications in marine seismic surveying, in which one or more towed sources are used to generate wavefields, and seismic receivers—either towed or ocean bottom—receive reflected seismic energy generated by the seismic sources. The disclosure may also have application to the acquisition and/or processing of seismic data in marine seismic surveying.

Figure 1B:
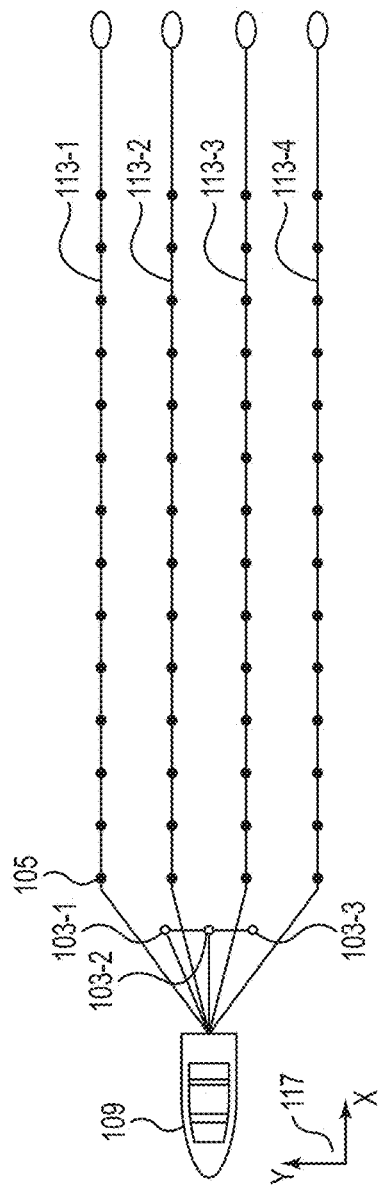

FIGS. 1A-1B illustrate coordinates and terminology associated with seismic data acquisition and/or seismic data processing according to one or more embodiments of the present disclosure. FIG. 1A illustrates an elevation or xz-plane 119 view of an example marine seismic survey vessel 109 towing a source 103 and a streamer 113 located beneath a free surface 115. In various embodiments, the source 103 can include one or more air guns and/or marine vibrators, among others, as source elements. In practice, source 103 and streamer 113 may be towed by the same or different vessels. FIG. 1A represents a snapshot, at an instant in time, of the undulating free surface 115 and corresponding smooth wave-like shape in the streamer 113. FIG. 1B includes xy-plane 117 and FIG. 1A includes an xz-plane 119 of the same Cartesian coordinate system used to specify coordinate locations within the fluid volume with respect to three orthogonal, spatial coordinate axes labeled x, y and z. The x coordinate uniquely specifies the position of a point in a direction parallel to the route of travel of the vessel 109 at a particular point in time, and the y coordinate uniquely specifies the position of a point in a direction perpendicular to the x axis and substantially parallel to the free surface 115 at vessel 109, and the z coordinate uniquely specifies the position of a point perpendicular to the xy-plane 117 at a particular point in time. The geoid 123 is the hypothetical surface of the sea level at vessel 109 and is used to define zero elevation (i.e., z=0). Shaded disks, such as shaded disks 105-1 and 105-2, represent seismic receivers spaced along streamer 113. Seismic receivers 105 can include, for instance, seismic receivers and/or electromagnetic receivers, among others. Although illustrated on a towed streamer 113, the seismic receivers 105 may be located on a number of ocean bottom cables (OBCs) and/or on nodes attached near or on the water bottom.

FIG. 1A includes an illustration of a shot and wave routes 129-1, 129-2 from the source 103 at a corresponding number of seismic receivers 105-1, 105-2. Also illustrated at the corresponding number of seismic receivers 105-1, 105-2 is arrival of a corresponding number of signals 127-1, 127-2 from the source 103 reflected off the free surface 115. As used herein, "source-side" can refer to some action, item, or event associated with the source (not with the seismic receiver), affecting a source, and/or positioned near or in the same location as the source, among others. "Receiver-side" can refer to the same association of actions, items, or events with a seismic receiver. FIG. 1A illustrates up-going wavefield 133 and down-going wavefield direction 135, as discussed further herein.

FIG. 1B illustrates a top or xy-plane 117 view of the marine seismic survey vessel 109 towing a source 103 with source elements 103-1, 103-2, 103-3 and four separate streamers 113-1, 113-2, 113-3, 113-4 located beneath a free surface. Embodiments are not limited to three source elements in a source, as a source can include more or fewer source elements. Some embodiments can, for example, include 35 source elements in the source. Furthermore, the source can be one-dimensional (e.g., arranged in a line as shown), two-dimensional (e.g., arranged in a rectangular grid), or three-dimensional (e.g., arranged in a cube), which can be termed an array of source elements or a source array. Source 103 may be a number of types including, but not limited to a small explosive charge, an electric spark or arc, a marine vibrator, and/or a seismic source gun, such as an air gun, among others. Source 103 may comprise a number of source elements in a source configuration, and can, without limitation, generate a short-duration impulse.

Embodiments are not limited to a particular number of streamers and can include more or fewer than are shown in FIG. 1B. Some embodiments can, for example, include 24 or more streamers. As illustrated, the streamers 113-1, 113-2, 113-3, 113-4 can be modeled as a planar horizontal acquisition surface located beneath the free surface. However in practice, the acquisition surface can be smoothly varying due to active sea currents and/or weather conditions. In other words, the towed streamers may also undulate as a result of dynamic conditions of the fluid. The coordinates of a particular seismic receiver are given by (x, y, z) taking into account both the xz-plane 119 and the xy-plane 117. In some embodiments, the seismic receiver array may vary in the z direction. For example, streamers may be slanted such that seismic receivers disposed farther from the vessel may be deeper than those closer to the vessel. Likewise, in some embodiments, one or more of the streamers may be towed at a different depth than other streamers, thereby creating an acquisition volume.

Although not illustrated, the marine seismic survey vessel 109 may include equipment, referred to herein generally as a "recording system", that may provide and/or include navigation control, navigation monitoring, including position determination, seismic source control, seismic source monitoring, seismic receiver control, seismic receiver monitoring, seismic data recording, time monitoring, and/or time synchronization between the various control, monitoring, and/or recording elements.

Although FIGS. 1A and 1B illustrate horizontal and/or straight-line towing, examples of the present disclosure may include circular towing and/or spiral towing, among other patterns. Although FIGS. 1A and 1B illustrate a single vessel, a plurality of vessels may be present, with some or all of the vessels towing streamers and some or all of the vessels triggering sources. The streamers may be towed in different directions, depths, and/or angles, among other differences.

Seismic data acquisition in accordance with one or more embodiments of the present disclosure may be applicable to a plurality of seismic data acquisition operations, including towed marine seismic, ocean bottom seismic, land seismic, among other implementations, and/or combinations thereof.

In embodiments utilizing ocean bottom nodes and/or OBCs, towed sources can be triggered and the resultant wavefield can be detected with nodal data receivers positioned on the water bottom.

Seismic data acquisition in accordance with the present disclosure can also include the use of a single seismic streamer or an OBC. Examples of the present disclosure can also be used with three-dimensional seismic data acquisition techniques, in which, for example, more than one seismic source and/or laterally spaced streamers and/or OBCs are used to acquire seismic data.

In some examples, a vessel can tow a source that can be triggered at selected times. In some examples, a streamer is also towed by the vessel. The streamer includes seismic receivers at spaced positions along the cable. Each seismic receiver can detect pressure and/or particle motion in the water and/or can be responsive to changes in the pressure and/or particle motion with respect to time.

In some embodiments, an OBC can include seismic receivers spaced along the OBC. Signals generated by the seismic receivers can be recorded by a recording unit for later retrieval and/or processing.

When a source is triggered, some acoustic energy travels downwardly. Some of the downwardly traveling energy can be reflected from the water bottom, whereupon the reflected energy travels upwardly. Some of the downwardly traveling energy also penetrates the water bottom and may reach a subsurface layer boundary. Acoustic energy may be reflected from the subsurface layer boundary, whereupon the reflected energy travels upwardly. The upwardly traveling acoustic energy can be detected by the seismic receivers on the streamer (or the receivers on nodes and/or an OBC at or near the water bottom if any are used). The upwardly traveling energy may reflect from the water surface, whereupon the energy travels downwardly again. The water surface reflected energy can be detected by the seismic receivers, resulting in a ghost signal. The water surface reflected energy also may be reflected from the water bottom and thereby become upwardly traveling energy. Further, acoustic energy can reflect from the water surface (becoming downgoing energy) and can again reflect from the water bottom (becoming up-going energy) a plurality of times, resulting in water-layer multiple reflections.

As a result of all the foregoing acoustic energy interactions with the water and the structures below the water, the acoustic energy detected by the seismic receivers, referred to as a "total wavefield", includes both the upwardly traveling energy (an up-going wavefield) and the downwardly traveling energy (a down-going wavefield). The up-going and down-going wavefields can include components resulting from subsurface reflectors and/or from water surface and water bottom reflections.

Common approaches to seismic data acquisition include synchronized recording of seismic data and firing of sources, and the triggering of the sources based on position. In such approaches, the recording starts shortly before or at the time when the sources are triggered, and the length of the records in time is defined such that it is less than the time it takes to move the vessel from one source position (or "shot point") to the next. This has meant that the shorter the spacing between the shot points, the less the recording time. Also, the acquisition speed may be limited by the defined record length and distance between shots. Further, a record length may need to be known before recording begins, and this length may stay the same throughout recording.

In contrast, as described herein, near-continuous recording may include no concept of individual records tied to shot points, and the start of the seismic recording may no longer be determined by source position. As used herein, "near-continuous" can include without meaningful breaks in the seismic recording. As would be understood by one of ordinary skill in the art with the benefit of this disclosure, operational circumstances can cause intermittent gaps in records (due to equipment failure, etc.), and "near-continuous recording" should be read to include records with intermittent or periodic gaps, whether planned or unplanned as well as records without intermittent or periodic gaps, thus including "continuous records." For simplicity, the term "near-continuous" and "near-continuously" will be used herein and do not exclude "continuous" or "continuously". The seismic data is recorded near-continuously and can be split into records (data samples) of desired length, possibly on board the vessel and/or during onshore processing. From these records it may be possible to splice records together to make longer near-continuous records. To enable such splicing, the beginning and/or end times of the records can be synchronized relative to a standard clock time, as described herein.

When the common approaches to seismic data acquisition use sources that are triggered based on position and/or positions with a specified spacing, there may be a required minimum listening time after the sources have stopped emitting signals. If sources are triggered in a time distributed fashion where a firing sequence is initiated based on position, the firing sequence has to be completed before the source has moved to the next shot point, where a firing sequence is initiated again. This may cause limitations in maximum acquisition speed. For instance, if the desired spacing between shot points is 25 m, and the minimum time between the shot points is 10 seconds, then the maximum speed the seismic vessel can typically move forward is 2.5 m/s. Triggering the sources in this way may limit how much energy can be put into the ground per unit of time.

Furthermore, it normally takes less time to recharge the sources than the travel time between shot points, so the triggering of sources based on position may be limiting in terms of how much energy can be put into the ground in total. In addition, sources may consist of a plurality of source elements in an array that may be triggered simultaneously to produce the maximum possible peak output. This method of operation may not be very environmentally friendly because a lot of energy is emitted in very short time periods. Triggering source based on position may result in shot records of limited rates, so any operators applied to the records may result in edge effects at the beginning and/or end of the records.

In contrast, embodiments of the present disclosure can include triggering sources based on time, not position. In some embodiments, this may result in a smaller time interval between each source trigger. In some embodiments, there may not be a required listening time after a source has finished emitting signals. This can allow for the unrestricted signal emission and/or shot firing, in some examples. Further, single source elements may be triggered individually, or a number of source elements may be triggered simultaneously or in a coordinated sequence. Processing the seismic data acquired in accordance with the present disclosure may include determination of a sequence of source triggering times. In addition, the position of each source element and the wavefield or wavefields emitted therefrom may be determined as a function of time. Moreover, the position of each of the seismic receivers also may be determined as a function of time.

Seismic data acquired from the seismic receivers can be recorded in a near-continuous fashion such that it is possible to make records with near-continuous seismic data. As described herein, the times of the recorded seismic data samples, the times when sources are triggered, and/or the positions of the source elements and/or seismic receivers as a function of time can be accurately determined and/or interrelated by these times being synchronized. This near-continuous seismic data can be handled with fewer edge effects and record length restrictions as compared to other approaches.

Embodiments of the present disclosure may allow for alternatives for firing all source elements at once. For instance, in a number of examples, instead of firing all source elements in a source array simultaneously, the source elements or a subset of the source elements may be triggered in sequences spread out over time. This means that the instantaneous maximum pressure levels and the sound pressure levels can be reduced as compared to other approaches. This may ameliorate some environmental concerns related to seismic surveying.

Furthermore, in some examples in accordance with the present disclosure, there may be few or no limits in terms of minimum shot intervals, minimum record lengths, and/or maximum acquisition speeds. Therefore, the acquisition speed can be faster than other approaches with consequential time and/or efficiency savings. Seismic data acquired as such may be more accurate due to the closer spatial relationships.

In some instances, air compressor capacity that is available on a towing vessel can be better utilized as compared to other approaches. Because there may be few or no restrictions on listening time after a source has been triggered, and because a subset of the available source elements may be triggered in predetermined sequences spread over time, the onboard air compressors may not need to recharge as large a volume in the source elements for every shot. As a result, the total energy emitted in a survey may be increased and/or the signal to noise ratio (S/N) may be improved across the frequency band, including ultra-low frequencies.

In some examples of the present disclosure, during the processing of seismic data, a depth range of a resulting seismic image can be chosen and may be larger than in other seismic data acquisition and/or processing approaches with a fixed record length. In a number of examples, sources can be triggered at higher spatial densities as compared to other approaches and/or the shot intervals can be chosen during processing to have a finer spacing than in other approaches. The methods described herein may be applicable to a plurality of seismic data acquisition techniques, including towed marine seismic, ocean bottom seismic, and/or land seismic, among others. More details with regard to how the seismic data acquisition may be performed, and how the resulting seismic data may be processed will be discussed further herein.

For instance, in some example embodiments, acquisition of seismic data may include recording of seismic data from geophysical receivers. As described herein, these receivers can include ocean bottom receivers, land receivers, and/or receivers located on a towed streamer. As such, embodiments can include, towing at least one streamer and a plurality of source elements behind a vessel in a body of water, where the seismic receivers are located on the towed streamer. As used herein, the term "receiver" is intended to mean "seismic receiver" unless described otherwise. The receivers can include hydrophones, geophones, pressure sensors, particle motion sensors, among other types of seismic sensors, and/or combinations thereof. That is, in various embodiments, at least two of the plurality of source elements can be different types of source elements.

The recording of the seismic data from the receivers can start before the first source is triggered, and the recording system can near-continuously record the seismic data from a plurality of seismic receivers. The seismic data may be split up into records (data samples) of limited length, such that it is possible to splice the records together to create a near-continuous record. The positions of the source elements and/or the receivers as a function of time relative to the start time of the near-continuous recording can be determined, for example, based on data input from the navigation systems as monitored by the recording system. The positions may have a sufficient density such that they are not aliased in a spatial or temporal sense. In other words, positions for every time sample in the seismic records may not be needed, provided that such information can be interpolated from the available positions without ambiguity. Rather a portion of the positions for each source element can be determined and others interpolated.

Different source elements may be triggered at predefined times relative to the start of the near-continuous recording. For example, the near-continuously recording of seismic data received from a plurality of receivers can start prior to triggering of any of the source elements. The time interval between triggering source elements may be very short, such as only a few milliseconds, and, in some instances, triggering of the source elements may not be regularly distributed in time (with equal-sized time intervals) and/or the source element positions may not be regularly spaced (with equal-sized separations). The time intervals can be random or pseudorandom, for instance. In some examples of towed receivers, the towing vessel can move at any speed, as shot point triggering can be based on time, not position. The depths of the shot point may be different, for example, between about 5 and about 15 meters, such that in the case of marine seismic surveys, diversity of the ghost from the desired seismic data can be achieved to enable a robust de-ghosting. As it applies to marine seismic data acquisition, a ghost effect can result from reflections from the sea surface. Ghost reflections can interfere with primary reflections, limiting useable bandwidth and/or data integrity.

In an example embodiment, for each source element that is triggered, the following information may be determined: which source element was triggered; the time it started to emit signals; the wavefield that was emitted, (which may be determined based on supplementary information such as near-field hydrophone recordings or on some form of modeling/signature estimation based on measurements of air pressure in the guns, atmospheric pressure, water temperature at the gun depths, volume of air released and/or depth of the source elements, etc., in the case of air guns); the depth of each source element as a function of time; and/or the position of each source element as a function of time.

As noted, it may not be necessary to know the position of the shot points at each time sample in the recorded seismic data or exactly at the time when each source element is triggered, provided that the positions of the source elements are sampled with sufficient density both in a temporal and spatial sense such that they can be interpolated to the time of interest. In a number of examples, clocks on the seismic data recording, source controller, and/or navigation systems, and possibly others, may be synchronized accurately by the recording system such that the times from the different systems can be related to each other. Accordingly, in some embodiments, the positions of the source elements and/or the seismic receivers can be derived based on data input from one or more navigation systems of a marine seismic survey vessel, the positions of the source elements and/or the seismic receivers determined entirely as a function of time relative to a start time of the near-continuous recording.

In order to produce an image of the sub-surface, the recorded seismic data can be processed. One example approach includes performing a direct imaging of the seismic data using a Separated Wavefield IMaging (SWIM) approach. For instance, both up-going and down-going wavefields recorded by a receiver can be used to yield seismic images based upon surface multiples. This can provide complementary and useful images at a plurality of target depths. Shallow geophysical analysis may be possible, for example, even in areas of very shallow water. Deep imaging around and/or below salt bodies and other complex geology may be improved, particularly for multi-vessel survey scenarios, including wide-azimuth, full-azimuth, etc. Incorporation of surface multiples into the imaging process can also improve subsurface illumination, in a number of examples.

Other example embodiments can be used to process the recorded seismic data. While the following example approach is described in a particular order, no specific order is necessary for processing the recorded seismic data.

If the recorded seismic data from the receivers are split up into records of limited lengths in time, the records can be spliced together such that the seismic data that has been recorded in a given receiver position is included in the same trace. In some examples, the given receiver position can include all the seismic data that has been recorded in a given receiver position. In contrast to other approaches, this can allow for a near-continuous record, rather than multiple, time-incremented individual records.

If seismic data recorded near-continuously have been split into records of limited lengths, all seismic data originally recoded near-continuously may be spliced together into one record. In the case of towed streamers, in which the receivers are near-continuously moving as a function of time, it may be useful to perform a spatial shift for each time sample to put the seismic data samples into the receiver positions at the time they were recorded. In some instances, for some seismic data acquisition methodologies where the receivers are located in fixed positions for the entire duration of the near-continuous record, such a spatial correction may not be applicable. An example of seismic data after many seismic records have been spliced together and after a spatial correction has been applied to each time sample is illustrated in FIG. 2.

Figure 2:
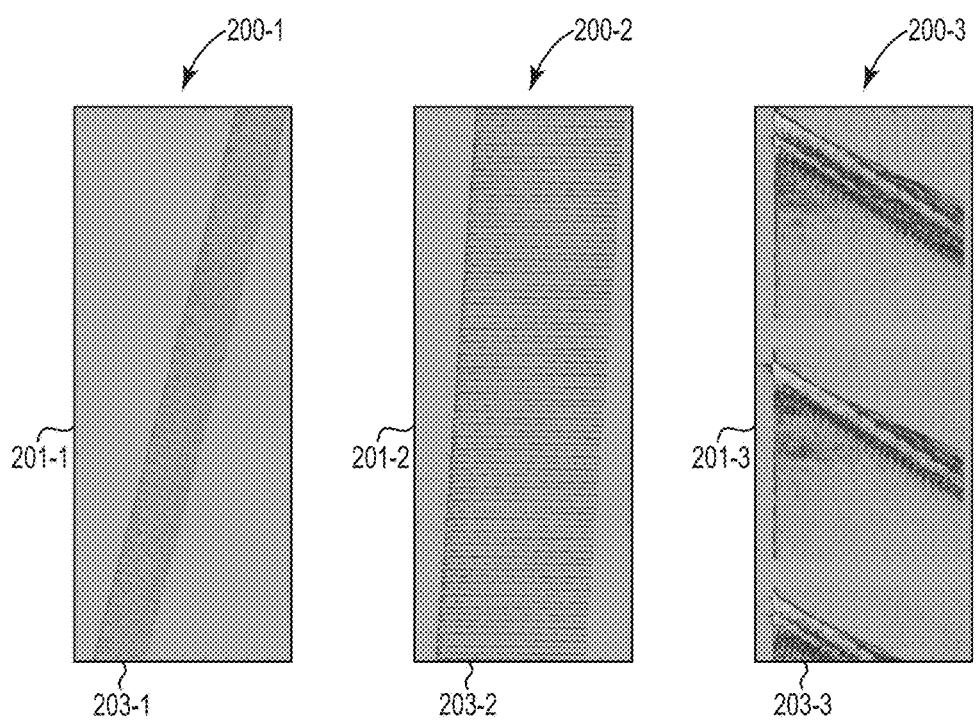
FIG. 2 illustrates diagrams of a recording after splicing and spatial shift of recorded seismic data according to one or more embodiments of the present disclosure.

FIG. 2 illustrates diagrams 200-1, 200-2, and 200-3 of a recording after splicing and spatial shift of recorded seismic data according to one or more embodiments of the present disclosure. Diagram 200-1 illustrates an example of an entire near-continuous record after spatial shifts to correct for motion of the receivers. The examples illustrated in FIG. 2 include seismic data received from one common receiver at a plurality of different source positions over time. For instance, FIG. 2 includes many seconds of seismic data at one receiver position. Diagram 200-2 illustrates a zoom of a particular time period of the record shown in diagram 200-1. Diagram 200-3 illustrates a different zoom of a particular time period of the record shown in diagram 200-1.

In the examples illustrated in FIG. 2, the x-axes 203-1, 203-2, and 203-3 can represent a spatial position of the receivers, and the y-axes 201-1, 201-2, and 201-3 can represent time. For example, the vessel with its streamer towed behind moves a greater distance in diagram 200-1 as compared to diagram 200-3 because diagram 200-1 represents a longer time period than diagram 200-3. Diagrams 200-1, 200-2, and 200-3 do not include the same aspect ratios.

The aforementioned spatial shift can be performed using an operator applied to the seismic data in a wavenumber-time domain. The spatial shift includes shifting the seismic data spatially in an x-direction, and the operator can include:

$$O(k_x,t)=e^{-ik_x \Delta x_i} \quad (1)$$

where $k_x$ is the horizontal wavenumber in the x-direction (typically in-line), and $\Delta x_i$ is the distance the receiver has moved in the x-direction at time t relative to the start of the near-continuous recording. This operator can be applied as a complex multiplication in the wavenumber-time domain, and the seismic data can be transformed back to space and time through an inverse Fourier transform.

In a number of embodiments, after this spatial shift as a function of time, the seismic data can be organized such that each trace represents seismic data from one common receiver position in the x-direction. Any receiver-based operations, such as wavefield separation or receiver side de-ghosting, may be performed at this point. This organization of the seismic data into one near-continuous record may reduce edge effects as compared to conventional methods of organizing and/or processing the seismic data in individual records of limited lengths.

Figure 3:
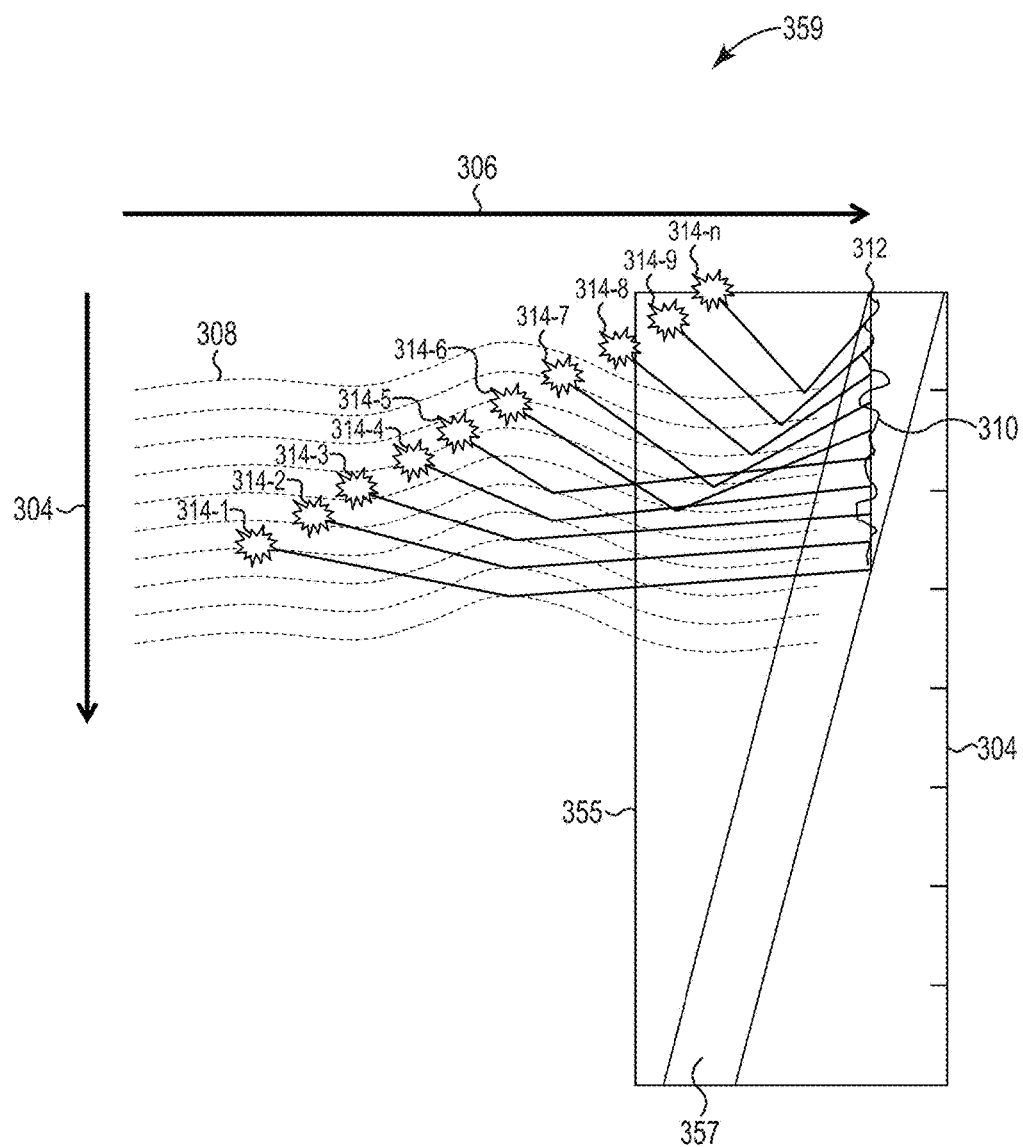
FIG. 3 illustrates a diagram of example seismic data associated with seismic data acquisition and/or seismic data processing according to one or more embodiments of the present disclosure.

FIG. 3 illustrates a diagram 359 of example seismic data associated with seismic data acquisition and/or seismic data processing according to one or more embodiments of the present disclosure. As illustrated in FIG. 3 and within box 355, one trace 357 in one common receiver position 312 may contain seismic data from a plurality of source elements 314-1, 314-2, . . . , 314-n triggered at different times relative to the start of the common receiver trace. In some examples, the common receiver position 312 can include the time it takes an entire receiver to be towed through that particular position. For instance, this could take an estimated 2,000 to 3,000 seconds in some examples. As illustrated in FIG. 3, y-axis 304 can represent a time when a source element is triggered, and x-axis 306 can represent the source element position. Pressure variation at receiver position 312 is illustrated as line 310, while an interface of the subsurface can be illustrated by line 308, for example.

Figure 4:
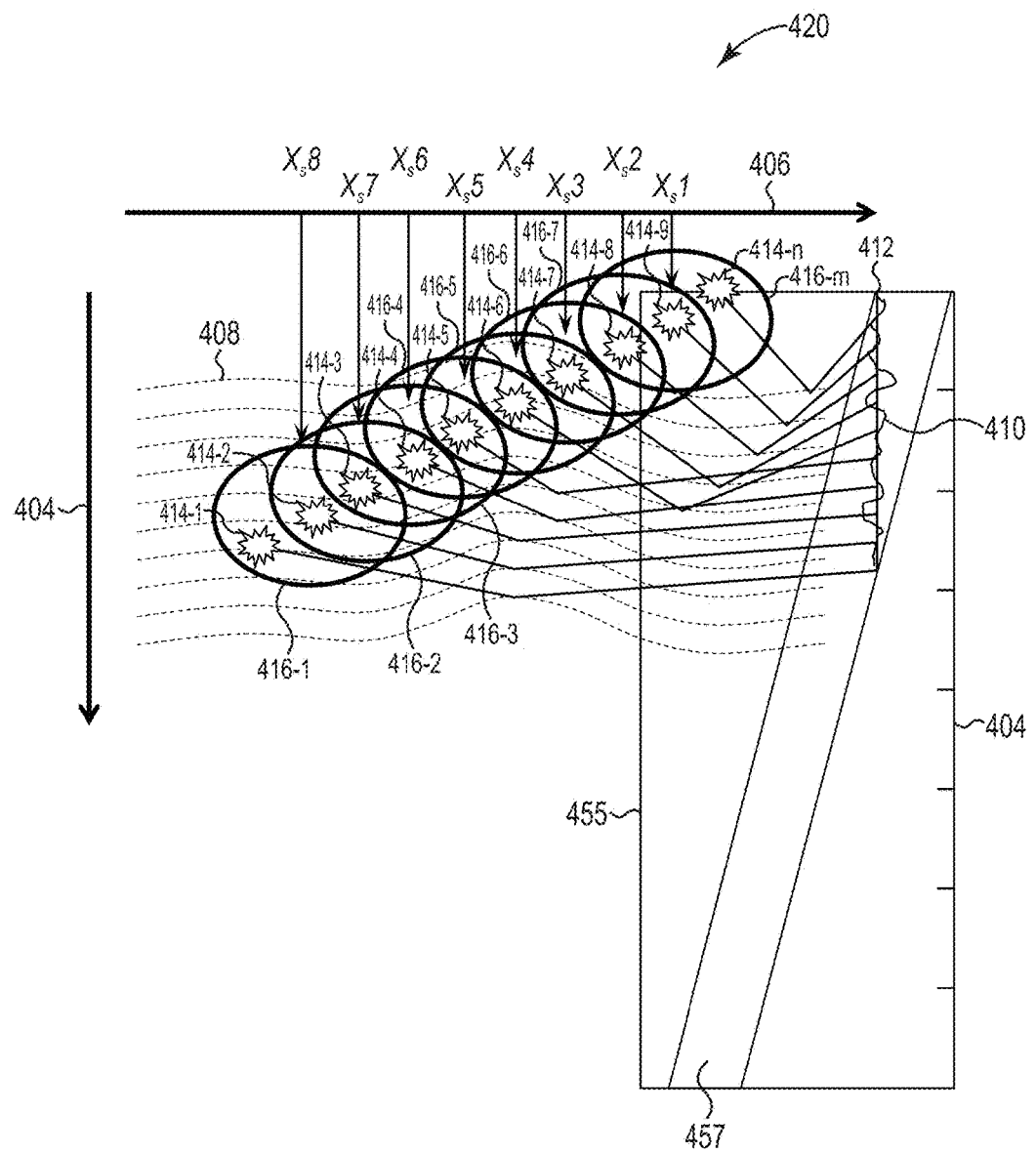
FIG. 4 illustrates a diagram of example seismic data associated with seismic data acquisition and/or seismic data processing according to one or more embodiments of the present disclosure.

FIG. 4 illustrates a diagram 420 of example seismic data associated with seismic data acquisition and/or seismic data processing according to one or more embodiments of the present disclosure. As illustrated in FIG. 4 and within box 455, one trace 457 in one common receiver position 412 may contain seismic data from a plurality of source elements 414-1, 414-2, . . . , 414-n triggered at different times relative to the start of the common receiver trace. For instance, y-axis 404 can represent a time when a source element is triggered, and x-axis 406 can represent the source element position. Source elements 414-1, 414-2, . . . , 414-n can be grouped into source arrays 416-1, 416-2, . . . , 416-m ($X_s 8$, . . . , $X_s 1$) triggered in different positions with source elements triggered at different times. If the time when each source element was triggered is known, and its position in addition to the wavefield it emitted is determined, the wavefield emitted from each source array can be calculated and/or corrected into a wavefield as if it was emitted from a single point in space and time. In some examples, this may be stable only if there are no deep notches in the total wavefield emitted by the source array. As noted, groups of source elements 414-1, 414-2, ..., 414-n can be considered as source arrays in different spatial positions relative to the common receiver position 412, and the spatial information can be contained along the time axis 404 of the common receiver trace 457. For instance, source array 416-3 can include source elements 414-3, 414-4, and 414-5. In some examples, different source arrays can overlap and include common points, e.g., array 416-6 and array 416-7 both include source element 414-8. Each source array can include information associated with different source positions relative to the common receiver position.

Similar to FIG. 3, y-axis 404 can represent a time when a source element is triggered, and x-axis 406 can represent the source element position. Pressure variation at receiver position 412 is illustrated as line 410, while an interface of the subsurface can be illustrated by line 408, for example. Source arrays 416-1, 416-2, ..., 416-m may be consistent or inconsistent in size, and can be a plurality of different sizes, e.g., 3 source elements, 50 source elements, 100 source elements, etc., for instance, depending on how they are triggered.

Figure 5:
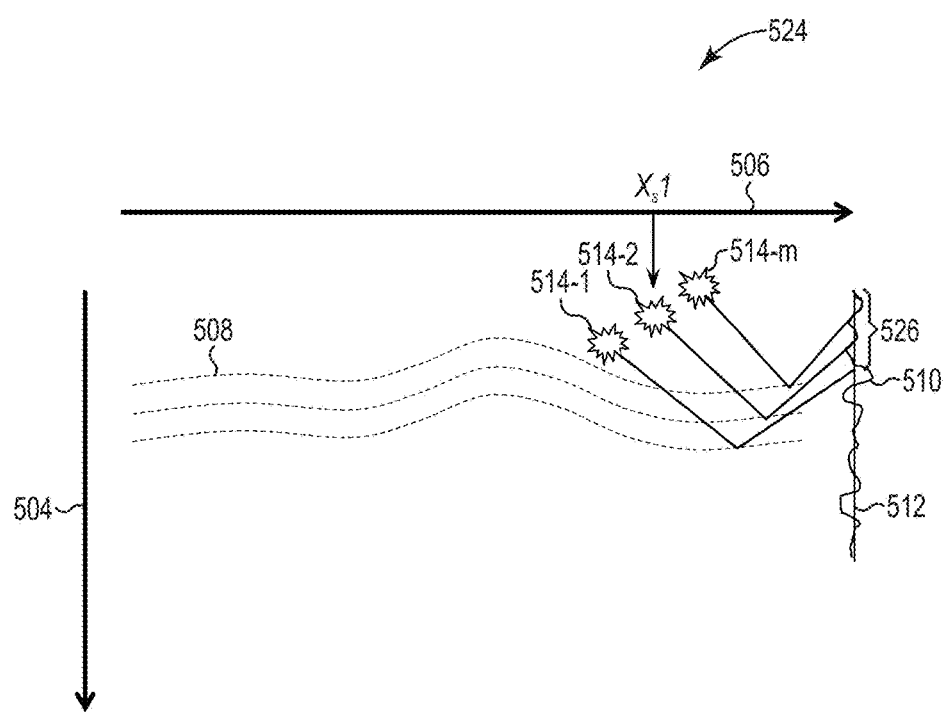
FIG. 5 illustrates a diagram of example seismic data associated with seismic data acquisition and/or seismic data processing according to one or more embodiments of the present disclosure.

FIG. 5 illustrates a diagram 524 of example seismic data associated with seismic data acquisition and/or seismic data processing according to one or more embodiments of the present disclosure. In order to determine which source elements are included in a particular source array, a trace can be divided into time windows. As illustrated in FIG. 5, a limited time window 526 of a common receiver trace has been contributed to by a specific set of source elements 514-1, 514-2, 514-m. These source elements 514-1, 514-2, 514-m may be considered as a source array including any number of source elements at different positions triggered at different times. The number of source elements contributing to any window may depend on the window length and/or position. The source elements may be triggered at unequal time intervals, so it may be that a slightly different number of sources may fall into each window 526 (of fixed length) as it moves down the trace. The limited time window 526 can allow for seismic data to be transformed into the source array, with the appearance that all of the source elements 514-1, 514-2, 514-m were triggered at the same time. Similar to FIGS. 3 and 4, y-axis 504 can represent a time when a source element is triggered, and x-axis 506 can represent the source element position. Pressure variation at receiver position 512 is illustrated as line 510, while an interface of the subsurface can be illustrated by line 508, for example.

An operator can be defined to transform the recorded seismic data in the time window to seismic data that would have been recorded had the source elements been triggered at the same time; for instance, a new array can be calculated. If the wavefield emitted by each source element is $S_n(\omega)$ and the time each source element was triggered relative to the start time of the common receiver trace is $\Delta t_n$, then an operator may be applied to the time window of the common receiver trace to convert the wavefield emitted by this source array into a wavefield emitted by a source array including the same number of source elements in the same spatial positions each emitting a spike of the same amplitude and triggered at the same time. The operator may be applied as follows:

$$O(\omega) = \frac{1}{\sum_n S_n(\omega)e^{-i\omega\Delta t_n}} \quad (2)$$

Alternatively, the correction may be applied using a least squares approach:

$$O(\omega) = \frac{\sum_n \overline{S}_n(\omega)e^{it_n}}{\left|\sum_n S_n(\omega)e^{-i\omega\Delta t_n}\right|^2 + \epsilon} \quad (3)$$

The overbar denotes the complex conjugate, and $\epsilon$ is a stabilization parameter to avoid division by zero. A band pass filter may be applied in addition, to band limit the output. The operator can be applied as a complex multiplication in the frequency domain, and then the seismic data can be transformed back to time.

Figure 6:
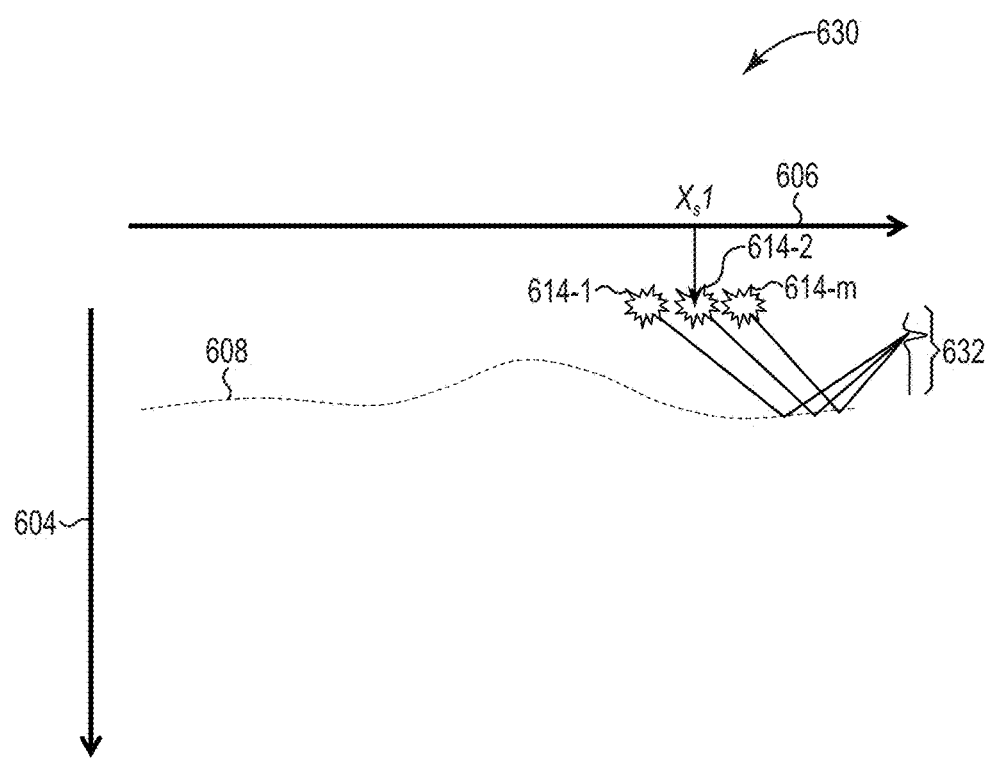
FIG. 6 illustrates a diagram of example seismic data associated with seismic data acquisition and/or seismic data processing according to one or more embodiments of the present disclosure.

FIG. 6 illustrates a diagram 630 of example seismic data associated with seismic data acquisition and/or seismic data processing according to one or more embodiments of the present disclosure. Diagram 630 includes seismic data resulting from the operator in Equation (2) or (3) being applied. As illustrated, the operator $O(\omega)$ can convert the wavefield emitted from this source array including source elements 614-1, 614-2, and 614-m triggered at different times, each with a wavefield emitted that is $S_n(\omega)$, into a wavefield emitted from an array in the same spatial position including source elements triggered at the same time each emitting a spike (or some desired band-limited wavelet). For instance, limited time window 632 can be illustrated as a resulting trace with a same spatial position for source elements 614-1, 614-2, and 614-m. Similar to FIG. 5, y-axis 604 can represent a time when a source element is triggered, and x-axis 606 can represent the source element position. An interface of the subsurface can be illustrated by line 608.

Figure 7:
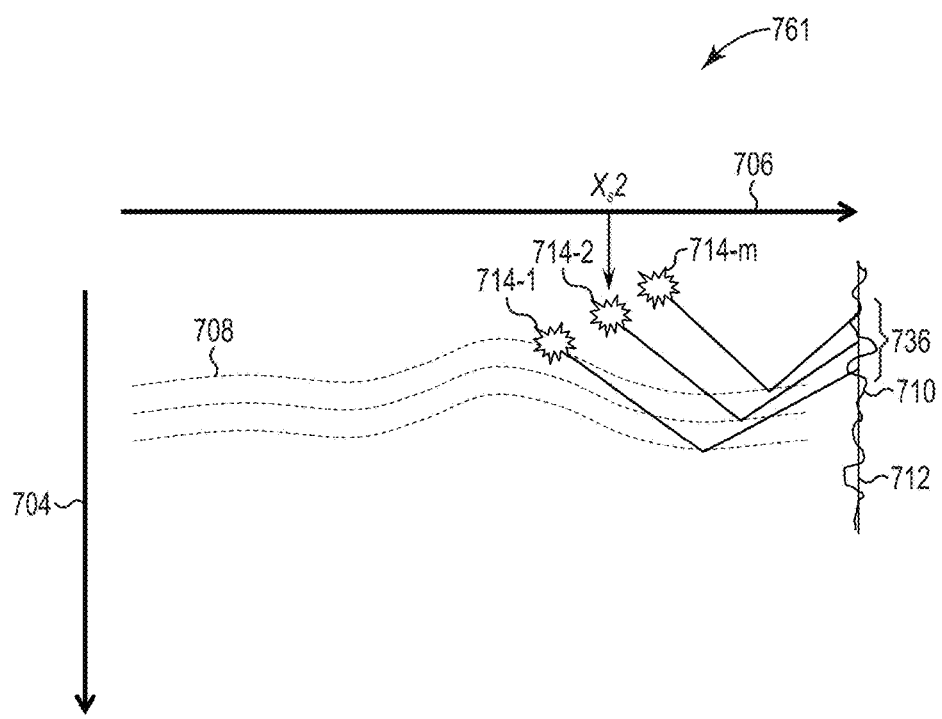
FIG. 7 illustrates a diagram of example seismic data associated with seismic data acquisition and/or seismic data processing according to one or more embodiments of the present disclosure.
Figure 8:
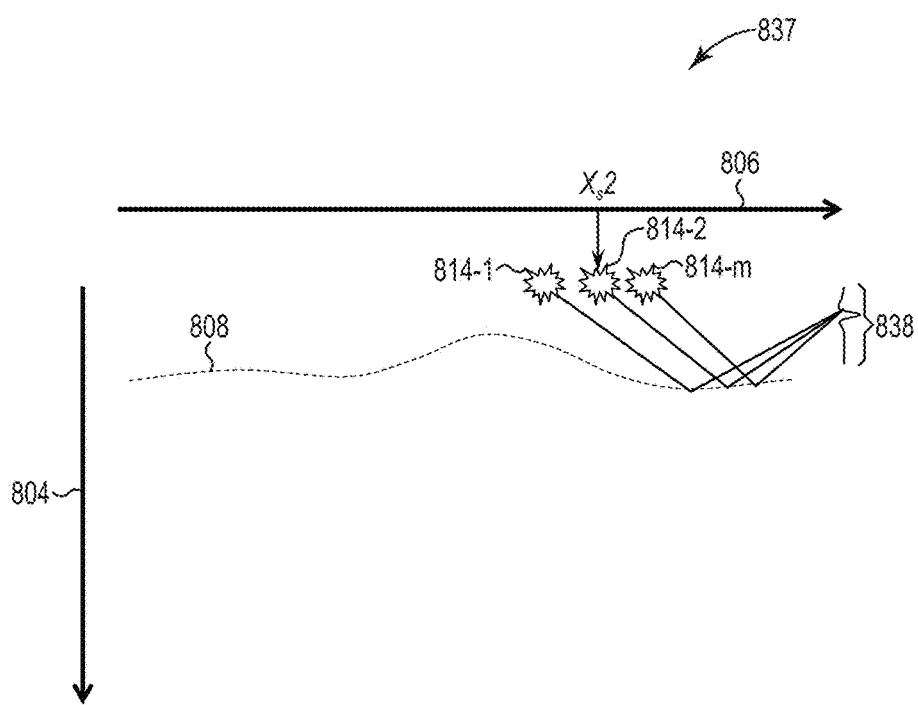
FIG. 8 illustrates a diagram of example seismic data associated with seismic data acquisition and/or seismic data processing according to one or more embodiments of the present disclosure.

FIGS. 7 and 8 illustrate how methods described with respect to FIGS. 5 and 6 can be repeated for a different time window to end up with one source array in a different spatial position relative to the common receiver position.

For example, FIG. 7 illustrates a diagram 761 of example seismic data associated with seismic data acquisition and/or seismic data processing according to one or more embodiments of the present disclosure. As illustrated in FIG. 7, a second time window 736 of the common receiver trace can be considered, with some different source elements 714-1, 714-2, and 714-m in different positions relative to the common receiver position contributing to window 736. Similar to FIG. 6, y-axis 704 can represent a time when a source element is triggered, and x-axis 706 can represent the source element position. An interface of the subsurface can be illustrated by line 708.

FIG. 8 illustrates a diagram 837 of example seismic data associated with seismic data acquisition and/or seismic data processing according to one or more embodiments of the present disclosure. As illustrated in FIG. 8, an operator can be derived that converts the wavefield emitted from the second source array into a wavefield emitted from another array in the same spatial position including source elements triggered at the same time, with each emitting a spike (or some desired band-limited wavelet). Similar to FIG. 7, y-axis 804 can represent a time when a source element is triggered, and x-axis 806 can represent the source element position. An interface of the subsurface can be illustrated by line 808.

These new arrays, as illustrated in FIGS. 6 and 8, can be used to create a "common receiver gather". As used herein, a "gather" of seismic data represents a set of traces. A common receiver gather is a set of traces recorded at a single receiver position, where each trace in the gather represents detection of a wavefield emitted by an individual source element at a particular position, for example, in an array of source elements. In some examples, traces from all positions of source elements in a source array can be collected and combined to create this common receiver gather. In contrast, a "common shot gather" is a set of traces related to a single source element position, where each trace in the gather represents seismic data recorded at a different receiver position.

Figure 9:
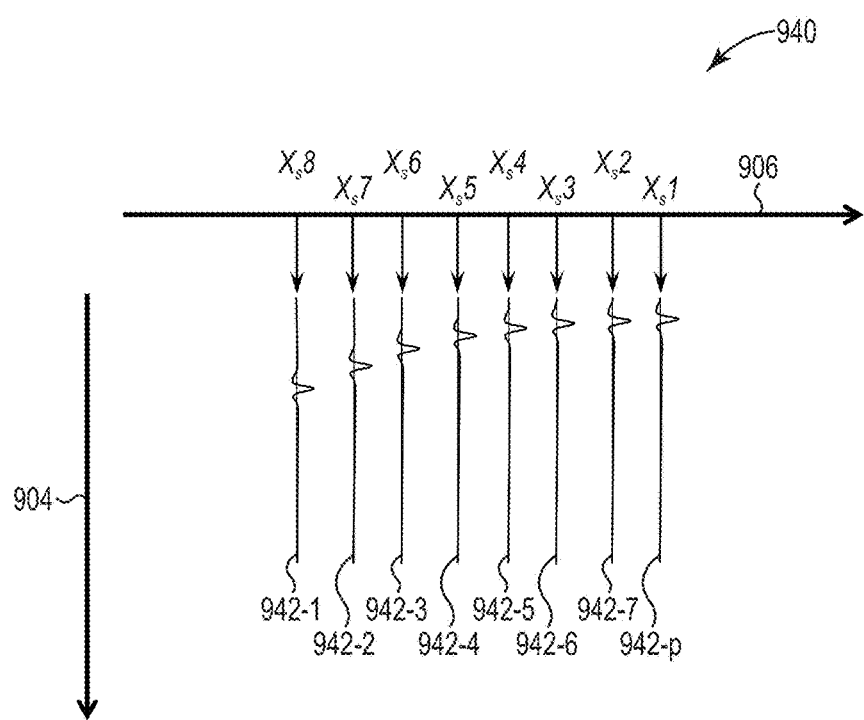
FIG. 9 illustrates a diagram of example seismic data associated with seismic data acquisition and/or seismic data processing according to one or more embodiments of the present disclosure.

FIG. 9 illustrates a diagram 940 of example seismic data associated with seismic data acquisition and/or seismic data processing according to one or more embodiments of the present disclosure. As illustrated in FIG. 9, seismic data from all of the source element positions derived through methods associated with FIGS. 5-8 can be gathered into one common receiver gather, in which each trace represents the offset or lateral distance between the common receiver position and each source array. In some embodiments, the seismic data may be organized such that a two-dimensional operator may be applied to the seismic data. In some embodiments, the seismic data may be organized such that a three-dimensional operator may be applied to the seismic data. The spacing between each trace is defined by the time windows chosen, the time between them, and the vessel speed. The time windows and the source arrays output from these steps may be overlapping. However, a different set of source elements may contribute in each time window in order to end up with source arrays in different positions. This factor may be related to the shot spacing in time and space of the input seismic data, and defines the minimum spacing between the output source arrays from the methods associated with FIGS. 5-8.

The example illustrated in FIG. 9 includes source arrays with pulses shown on lines 942-1, . . . , 942-p. The seismic data associated with FIG. 9 may allow for correction of wavefields emitted by source arrays including multiple source elements in different spatial positions into a wavefield emitted from a single point in space. A wavefield emitted from a single point in space may be desired because of improved spatial resolution of the resulting seismic data. This correction will be discussed further herein with respect to FIG. 10. In a number of examples, lines 942-1, . . . , 942-p can represent pressure signals received from a reflector in the common receiver position from different source arrays. Axis 904 can be a time axis, and axis 906 is a position axis.

An operator that may be applied to the two-dimensional common receiver gather in the frequency-wavenumber domain to convert the wavefield emitted from a source array into a wavefield emitted from a single point in space without the source ghost may be:

$$\frac{1}{\sum_n (e^{ik_z z_n} + re^{-ik_z z_n})e^{-ik_x x_n}} \quad (4)$$

where r is the reflectivity of the sea surface, $z_n$ is the depth of source element n, $x_n$ is the spatial position of source element n relative to a center of the source array, $k_x$ is the horizontal wavenumber in the x direction (in-line), and $k_z$ is the vertical wavenumber given by:

$$k_x = \sqrt{\left(\frac{\omega}{c}\right)^2 - k_x^2 - k_y^2} \quad (5)$$

where c is the propagation velocity of sound in water.

Alternatively, the operator expressed in Equation 4 may be applied using a least squares approach:

$$O(\omega) = \frac{\sum_n (e^{-ik_z z_n} + re^{-ik_z z_n})e^{ik_x x_n}}{\left|\sum_n (e^{ik_z z_n} + re^{-ik_z z_n})e^{-ik_x x_n}\right|^2 + \epsilon} \quad (6)$$

Figure 10:
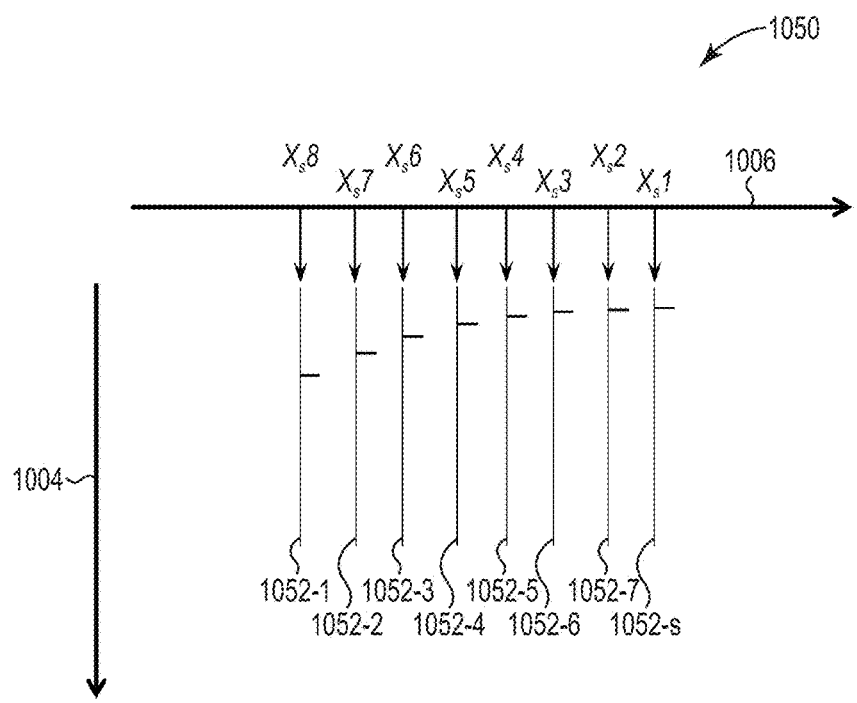
FIG. 10 illustrates a diagram of example seismic data associated with seismic data acquisition and/or seismic data processing according to one or more embodiments of the present disclosure.

FIG. 10 illustrates a diagram 1050 of example seismic data associated with seismic data acquisition and/or seismic data processing according to one or more embodiments of the present disclosure. As illustrated in FIG. 10, the wavefields emitted by source arrays can be converted to wavefields emitted from single points in space, and effects of the ghosts can be deconvolved, for instance, using equation (4) or (6). Two-dimensional de-ghosting of the seismic data can be performed, for instance, provided there is diversity in the depths of the source elements. In some examples, three-dimensional de-ghosting of the seismic data can be performed.

Diagram 1050 of FIG. 10 includes wavefields emitted from single positions in space, for instance, as illustrated by the spikes on lines 1052-1, . . . , 1052-s, as compared to the pulses of FIG. 9. In contrast to FIG. 9, lines 1052-1, . . . , 1052-s can represent reflectivity, as opposed to pressure, as de-ghosting has occurred, and the seismic data includes wavefields emitted from single points in space rather than source arrays. In a number of examples, after application of the operator in the frequency-wavenumber domain, the seismic data may be transformed back to space-time. Operators can be applied to the two-dimensional common receiver gather to correct for the responses of the source arrays.

Accordingly, a processing system in accordance with a number of embodiments of the present disclosure can include a number of non-transitory machine readable media with instructions executable to perform a number of actions and/or functions. In various embodiments, the processing system can include instructions executable to select a plurality of time windows of a near-continuous record of seismic data contributed to by a respective plurality of sets of source elements that define a respective first plurality of source arrays, where at least two of the source elements in each of the plurality of sets of source elements are at different positions and are triggered at different times. The processing system can include instructions executable to convert a respective first wavefield emitted by each of the first plurality of source arrays into a respective second wavefield as though emitted by a respective second source array including a same number of source elements in a same spatial position, each emitting spikes of a same amplitude and triggered at a same time. The processing system can include instructions executable to create a common receiver gather based on the respective second wavefield and convert the common receiver gather as though emitted from a single point in space.

In various embodiments, the processing system can include instructions executable to convert the common receiver gather by applying an operator to the common receiver gather based on a reflectivity of a sea surface, a depth of the source elements, a horizontal wavenumber, and/or a vertical wavenumber. In various embodiments, the processing system can include instructions executable to de-ghost the common receiver gather based on the reflectivity of the sea surface, the depth of the source elements, the horizontal wavenumber, and/or the vertical wavenumber. In various embodiments, the processing system can include instructions executable to create the common receiver gather such that each trace within the common receiver gather represents an offset between a common seismic receiver position and a source array. In various embodiments, the near-continuous record of seismic data can be in split records and the processing system can include instructions executable to splice together the record to produce a trace with seismic data from a single acquired line.

A number of types of geophysical data may be generated in accordance with a number of embodiments of the present disclosure. In some embodiments, the geophysical data may include raw or processed data related to, for example, near-continuously recording seismic data received from a plurality of seismic receivers, triggering a plurality of source elements, based upon time and not based upon position, at a predefined sequence of times relative to a start of a near-continuous recording. In some embodiments, the geophysical data may include raw or processed data related to, for example, obtaining seismic data acquired based upon trigger times and not based upon positions of a plurality of triggered source elements, where the seismic data includes near-continuously recorded seismic data in split records. The split records can be spliced together into a single near-continuous record to produce a trace with seismic data from a single acquired line. The seismic data can be processed by performing a spatial shift for each of a number of time samples to correct for motion of a number of seismic receivers.

Geophysical data may be obtained and stored, that is, recorded, on a non-transitory, tangible machine-readable medium suitable for importing onshore. A geophysical data product may be produced by assembling and/or processing the geophysical data offshore (i.e., by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, seismic data processing can be performed from data offshore to facilitate other processing of the measured seismic data either offshore or onshore.

Figure 11:
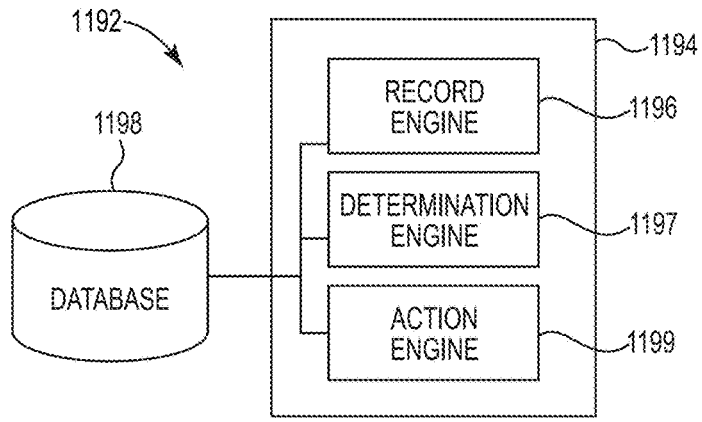
FIG. 11 illustrates a diagram of a system for seismic data acquisition and/or seismic data processing according to one or more embodiments of the present disclosure.

FIG. 11 illustrates a diagram of an example of a system 1192 for seismic data acquisition and/or seismic data processing according to the present disclosure. As shown in the example of FIG. 11, the system 1192 can include a database 1198 accessible by and/or in communication with a plurality of engines 1194. The engines 1194 can include a record engine 1196, a determination engine 1197, and an action engine 1199, for example. The system 1192 can include additional or fewer engines than illustrated to perform the various actions and/or functions described herein and embodiments are not limited to the example shown in FIG. 11. The system 1192 can include hardware in the form of transistor logic and/or application specific integrated circuitry (ASICs), firmware, and/or software, in the form of computer or machine readable and executable instructions (CRI/MRI). The CRI/MRI can be program instructions (programming) stored in a computer or machine readable medium (CRM/MRM) which in cooperation can form a computing device as discussed in connection with FIG. 12.

The plurality of engines 1194, such as record engine 1196, determination engine 1197, and/or action engine 1199, as used herein can include a combination of hardware and software, but at least includes hardware that is configured to perform particular functions, tasks, and/or actions. For instance, the engines shown in FIG. 11 are used for seismic data acquisition and/or seismic data processing.

For example, record engine 1196 can include hardware and/or a combination of hardware and program instructions to near-continuously record seismic data received from a geophysical receiver and action engine 1199 can include hardware and/or a combination of hardware and program instructions to trigger a plurality of source elements at predefined intervals relative to the start of the near-continuous recording. For example, the plurality of source elements can be triggered at predefined irregular time intervals.

The determination engine 1197 can, for example, include hardware and/or a combination of hardware and program instructions to determine for each source triggering: which of the plurality of source elements is triggered; at what time each of the plurality of source elements started to emit signals; a characteristic of a wavefield in the signals emitted by each of the number of source elements; a depth of each of the plurality of the source elements as a function of time; and/or a position of each of the plurality of source elements as a function of time. In some examples, at least two of the plurality of source elements may be located at different depths. After each of the number of source elements completes signal emission there may be no allotted listening time. For instance, source elements can be triggered with a shorter time interval as compared to other methods. Because example embodiments of the present disclosure have little or no allotted listening time, imaging time can be decreased. For instance, other approaches require listening times after triggering sources, and this listening time usually the length in time that will be imaged.

Once acquired, seismic data can be processed using the plurality of engines 1194. For instance, action engine 1199 can process seismic data acquired based on trigger times of the plurality of triggered source elements. The seismic data can be near-continuously recorded seismic data. In some instances, when the seismic data is received split into a plurality of records, action engine 1199 can splice together split near-continuously recorded seismic data into a near-continuous record.

Processing the seismic data can also include record engine 1196 obtaining data, for example, from the one or more navigation systems to determine positions of the plurality of triggered source elements from within the near-continuous record based on time, and action engine 1199 can organize the seismic data such that each near-continuous record represents seismic data from a common receiver direction and can apply an operator to the organized seismic data to convert a common receiver gather as though emitted from a single point in space. This can also include de-ghosting the common receiver gather. Action engine 1199 can apply an operator to the seismic data to shift the seismic data spatially based on a horizontal wavenumber in a particular direction and a receiver moved in the same direction at a particular time relative to the start of the near-continuous recording.

In some examples, determination engine 1197 can determine a particular time window to analyze as a source array based on and including particular source elements from within the triggered source elements, where the particular source elements are within the near-continuous record. In addition, action engine 1199 can apply an operator to convert a respective first wavefield emitted by each of the first plurality of source arrays into a respective second wavefield as though emitted by a respective second source array including a same number of source elements in a same spatial position, each emitting spikes of a same amplitude and triggered at a same time.

Based on the respective second wavefield and/or source element positions derived from the application of the operator to the time window, action engine 1199 can create a common receiver gather and apply an operator to the common receiver gather, where the operator is based on a reflectivity of a sea surface, a depth of each of the source elements within the same number of source elements, a spatial position of each of the source elements within the same number of source elements relative to the center of the source array, a horizontal wavenumber, and/or a vertical wavenumber.

Examples of the present disclosure are not limited to the example engines shown in FIG. 11 and, in some instances, one or more engines described may be combined or be a sub-engine of another engine. Further, the engines shown may be remote from one another in a distributed computing environment, cloud computing environment, etc.

Figure 12:
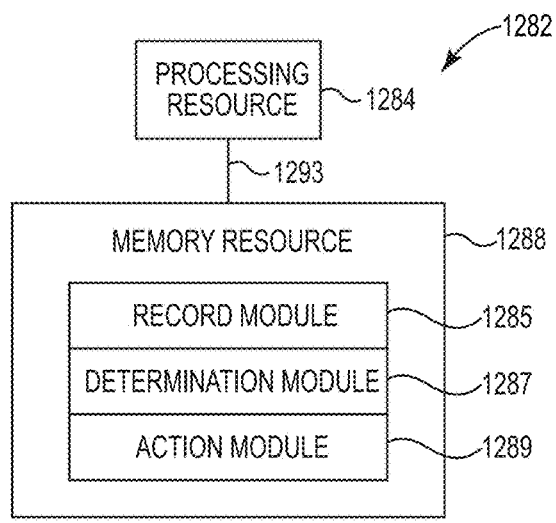
FIG. 12 illustrates a diagram of a machine for seismic data acquisition and/or seismic data processing according to one or more embodiments of the present disclosure.

FIG. 12 illustrates a diagram of an example of a machine 1282 such as a computing device, for seismic data acquisition and/or seismic data processing according to the present disclosure. The computing device 1282 can utilize hardware, software, such as program instructions, firmware, and/or logic to perform a number of functions, as described herein. The computing device 1282 can be any combination of hardware and program instructions configured to share information. The hardware can, for example, include a processing resource 1284 and/or a memory resource 1288, such as CRM/MRM, a database, etc. The processing resource 1284, as used herein, can include one or more processors capable of executing instructions stored by the memory resource 1288. The processing resource 1284 may be implemented in a single device or distributed across multiple devices. The program instructions, such as CRI/MRI, can include instructions stored on the memory resource 1288 and executable by the processing resource 1284 to perform a particular function, task and/or action, such as seismic data acquisition and/or seismic data processing.

The memory resource 1288 can be a non-transitory CRM/MRM, including one or more memory components capable of storing instructions that can be executed by the processing resource 1284, and may be integrated in a single device or distributed across multiple devices. Further, memory resource 1288 may be fully or partially integrated in the same device as processing resource 1284 or it may be separate but accessible to that device and processing resource 1284. Thus, it is noted that the computing device 1282 may be implemented on a participant device, on a server device, on a collection of server devices, and/or a combination of a participant, e.g., user, device and one or more server devices as part of a distributed computing environment, cloud computing environment, etc.

Memory resource 1288 can be in communication with the processing resource 1284 via a communication link, e.g., a path, 1293. The communication link 1293 can provide a wired and/or wireless connection between the processing resource 1284 and the memory resource 1288.

In the example of FIG. 12, the memory resource 1288 can include a plurality of modules, such as record module 1285, determination module 1287, and/or action module 1289. As used herein a "module" can include hardware and software, such as program instructions, but includes at least program instructions that can be executed by a processing resource, such as processing resource 1284, to perform a particular task, function and/or action, as described herein. The plurality of modules can be independent modules or sub-modules of other modules. As shown in FIG. 12, record module 1285, determination module 1287, and action module 1289 can be individual modules located on one memory resource or can be located at separate and distinct memory resource locations, such as in a distributed computing environment, cloud computing environment, etc.

Each of the plurality of modules can include instructions that when executed by the processing resource 1284 can function as a corresponding engine described in connection with FIG. 11. For example, the record module 1285 can include instructions that when executed by the processing resource 1284 can function as the record engine 1196 shown in FIG. 11. The determination module 1287 can include instructions that when executed by the processing resource 1284 can function as the determination engine 1197 shown in FIG. 11. In some instances, the action module 1289 can include instructions that when executed by the processing resource 1284 can function as the action engine 1199 shown in FIG. 11. In various embodiments, the record module 1285, the determination module 1287, the action module 1289, the processing resource 1284, and/or the memory resource 1288, among other elements described herein, can be utilized in combination as a recording system, as described herein.

In a number of examples, record module 1285 can near-continuously record seismic data received from a plurality of receivers. Action module 1289 can trigger, at predefined times relative to a start time of a near-continuous recording, a portion of a plurality of source elements at irregular time intervals and record received results of the triggering. These recorded results can be used in refining acquisition and/or processing of the near-continuously recorded seismic data.

Determination module 1287 can, in some embodiments, determine positions of a portion of the plurality of receivers as a function of time relative to the start time of the near-continuous recording. For instance, the positions of all of the receivers may not be known; rather the positions of a portion of the receivers can be determined based on time. In some examples, determination module 1287 can determine depths of the receivers as a function of time relative to the start time of the near-continuous recording. These depths may not all be the same; rather, at least two of the determined depths may be different.

In some examples, determination module 1287 can interpolate the positions of the portion of the plurality of receivers and/or another portion of the plurality of receivers with previously unknown positions. This makes it possible for only a portion of the positions to be determined based on time, rather than positions of each of the plurality of receivers. Action module 1289 can split the near-continuously recorded seismic data into a plurality of lengths and splice the split seismic data into a near-continuous record. This near-continuous record can be used for processing the near-continuously recorded seismic data, in some instances.

Action module 1289 can also, in some examples, synchronize time recording devices of the near-continuous recording, a source element controller, and navigation systems such that times from different systems are related to one another. This synchronization can improve accuracy in processing of the near-continuously recorded seismic data. Hence, action module 1289 can be part of the recording system.

During processing of seismic data, record module 1285 can receive a near-continuous record of seismic data, and determination module 1287 can select a plurality of time windows of a near-continuous record of seismic data contributed to by a respective plurality of sets of source elements that define a respective first plurality of source arrays. In some examples, at least two of the plurality of source elements in each of the plurality of sets of source elements are at different positions and are triggered at different times.

Action module 1289 can convert a respective first wavefield emitted by each of the first plurality of source arrays into a respective second wavefield as though emitted by a respective second source array including a same number of source elements in a same spatial position, each emitting spikes of a same amplitude and triggered at a same time. Action module 1289 can also create a common receiver gather based on the respective second wavefield to convert the common receiver gather as though emitted from a single point in space. Action module 1289, in some instances, can create the common receiver gather such that each trace within the common receiver gather represents an offset between a common receiver position and a source array.

In some examples, action module 1289 can convert the common receiver gather by applying an operator thereto based on a reflectivity of the sea surface, a depth of the source elements, a horizontal wavenumber, and a vertical wavenumber, and similarly, can de-ghost the seismic data based on the reflectivity of the sea surface, the depth of the source elements, the horizontal wavenumber, and/or the vertical wavenumber.

As previously noted, in some instances, seismic data may be acquired in split records. In such instances, record module 1285 can receive the seismic data in split records, and action module 1289 can splice the split records together into a single near-continuous record.

Embodiments are not limited to the examples modules shown in FIG. 12 and in some cases a number of modules can operate together to function as a particular engine. Further, the engines and/or modules of FIGS. 11 and 12 can be located in a single system and/or computing device or can reside in separate distinct locations in a distributed network, computing environment, cloud computing environment, etc.

Figure 13:
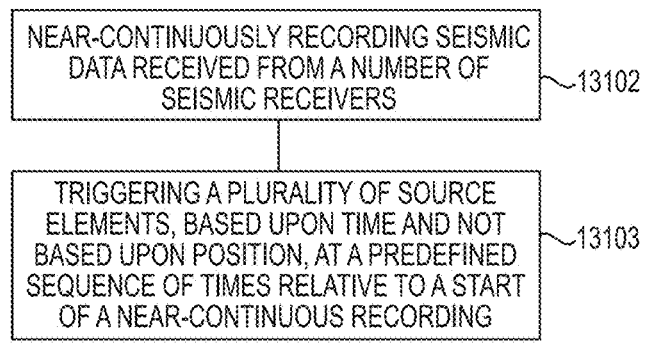
FIG. 13 illustrates an example method for seismic data acquisition according to one or more embodiments of the present disclosure.

FIG. 13 illustrates an example method 13100 for seismic data acquisition according to one or more embodiments of the present disclosure. As shown at 13102, the method 13100 can include near-continuously recording seismic data received from a number of seismic receivers. For instance, seismic data can be recorded without a meaningful break in the recording. As shown at 13103, the method 13100 can include triggering a plurality of source elements, based upon time and not based upon position, at a predefined sequence of times relative to a start of a near-continuous recording. The predefined sequence of times can include, for instance, triggering at randomly, pseudorandomly, and/or systematically varied sequences of times relative to the start of the near-continuous recording. In a number of examples, method 13100 can be performed by a machine, such as machine 1282 illustrated in FIG. 12.

As described herein, in various embodiments, the method can include determining for each triggering which of the plurality of source elements is triggered, at what time each of a plurality of the triggered source elements started to emit signals, a characteristic of a wavefield in the signals emitted by each of the plurality of source elements, a depth of each of the plurality of the source elements as a function of time, a position of each of the plurality of source elements as a function of time, and/or a position of each of the number of seismic receivers as a function of time. The function of time can, as described herein, include known times relative to the start of the near-continuous recording. Accordingly, after each of the plurality of source elements completes signal emission there is no allotted listening time.

As described herein, the method can, in various embodiments, include at least two of the plurality of source elements being located at different depths and/or at least two of the plurality of source elements being different types of source elements. The method can, in various embodiments, include towing at least one streamer and the plurality of source elements behind a vessel in a body of water, where the number of seismic receivers is a plurality of seismic receivers located on the towed streamer. In various embodiments, the number of seismic receivers can include seismic receivers fixed on or near a water bottom and/or the number of seismic receivers can include land seismic receivers.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    triggering, subsequent to beginning a near-continuous recording and at irregular time intervals, a plurality of source elements, based upon time and not based upon position, at a predefined sequence of times relative to a start of the near-continuous recording;
    near-continuously recording seismic data received from a number of seismic receivers from the beginning through the predefined sequence of times; and
    organizing, based on a reflectivity of a sea surface during the near-continuous recording, a position of each of the plurality of source elements, and a depth of each of the plurality of source elements, the seismic data into a single near-continuous record including a wavefield presented as if it was emitted from a single point in space and time.

2. The method of claim 1, further comprising determining for each triggering:
    which of the plurality of source elements is triggered;
    at what time each of a plurality of the triggered source elements started to emit signals;
    a characteristic of a wavefield in the signals emitted by each of the plurality of source elements;

the depth of each of the plurality of the source elements as a function of time;
the position of each of the plurality of source elements as a function of time; and
a position of each of the number of seismic receivers as a function of time; and
wherein the function of time comprises known times relative to the start of the near-continuous recording.

3. The method of claim 1, wherein the predefined sequence of times includes triggering at randomly, pseudo-randomly, and systematically varied sequences of times relative to the start of the near-continuous recording.

4. The method of claim 1, wherein at least two of the plurality of source elements are located at different depths.

5. The method of claim 1, wherein the near-continuously recording seismic data includes recording seismic data without a meaningful break in the recording.

6. The method of claim 1, wherein after each of the plurality of source elements completes signal emission there is no allotted listening time.

7. The method of claim 1, further comprising towing at least one streamer and the plurality of source elements behind a vessel in a body of water, wherein the number of seismic receivers is a plurality of seismic receivers located on the towed streamer.

8. The method of claim 1, wherein the number of seismic receivers includes seismic receivers fixed on or near a water bottom.

9. The method of claim 1, wherein the number of seismic receivers includes land seismic receivers.

10. The method of claim 1, wherein at least two of the plurality of source elements are different types of source elements.

11. A recording system comprising a non-transitory machine-readable medium storing instructions executable by a processing resource to cause the machine to:
trigger, subsequent to beginning a near-continuous recording, at predefined times relative to a start time of a near-continuous recording, a portion of a plurality of source elements at irregular time intervals;
near-continuously record results of the triggering received from a number of seismic receivers from the beginning through the predefined times, wherein the results of the triggering comprise a wavefield; and
convert, based on a reflectivity of a sea surface during the near-continuous recording, a position of each of the plurality of source elements, and a depth of each of the plurality of source elements, the results into a near-continuous record including a wavefield presented as if it was emitted from a single point in space and time.

12. The recording system of claim 11, wherein the instructions are executable to determine positions of a portion of the plurality of seismic receivers as a function of time relative to the start time of the near-continuous recording.

13. The recording system of claim 12, wherein the instructions are executable to interpolate the positions of the portions of the plurality of seismic receivers.

14. The recording system of claim 11, wherein the instructions are executable to:
split the near-continuously recorded seismic data into a plurality of lengths; and
splice the split seismic data into a continuous record.

15. The recording system of claim 12, wherein the instructions executable to determine positions of the portion of the plurality of seismic receivers include instructions executable to determine positions of the seismic receivers as a function of time relative to the start time of the near-continuous recording.

16. The recording system of claim 15, wherein at least two of the determined depths are different.

17. The recording system of claim 11, wherein the instructions are executable to synchronize time recording devices of the near-continuous recording, a source element controller, and navigation systems such that times from different systems are related to one another.

18. A method of generating a geophysical data product, the method comprising:
obtaining geophysical data by:
triggering, subsequent to beginning a near-continuous recording and at irregular time intervals, a plurality of source elements, based upon time and not based upon position, at a predefined sequence of times relative to a start of the near-continuous recording;
near-continuously recording seismic data received from a number of seismic receivers from the beginning through the predefined sequence of times; and
organizing, in a frequency-wavenumber domain and based on a reflectivity of a sea surface during the near-continuous recording, a position of each of the plurality of source elements, and a depth of each of the plurality of source elements, the seismic data into a single near-continuous record including a wavefield presented as if it was emitted from a single point in space and time;
processing the geophysical data to generate a geophysical data product; and
recording the geophysical data product on a non-transitory machine-readable medium.

19. The method of claim 18, further comprising performing geophysical analysis onshore on the geophysical data product.

20. The method of claim 18, further comprising performing geophysical analysis offshore on the geophysical product.

21. The method of claim 18, wherein processing the geophysical data comprises processing the geophysical data offshore or onshore.

* * * * *